(12) United States Patent
Bang

(10) Patent No.: US 6,721,174 B2
(45) Date of Patent: *Apr. 13, 2004

(54) PORTABLE INFORMATION PROCESSING APPARATUS

(75) Inventor: Young Un Bang, Ansan-si (KR)

(73) Assignee: LG. Philips LCD Co., Ltd., Seoul (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 238 days.

(21) Appl. No.: 09/109,884

(22) Filed: Jul. 2, 1998

(65) Prior Publication Data

US 2001/0038523 A1 Nov. 8, 2001

(30) Foreign Application Priority Data

Jun. 30, 1998 (KR) .......................................... P98-26299

(51) Int. Cl.7 ............................................... G06F 1/16
(52) U.S. Cl. ...................................... 361/681; 361/683
(58) Field of Search ................................ 361/681, 679, 361/683, 686; 349/58; 359/48

(56) References Cited

U.S. PATENT DOCUMENTS 4,713,277 A   12/1987  Akiyama et al.
5,146,354 A  *  9/1992  Plesinger ..................... 359/49
5,872,606 A  *  2/1999  Kim ............................. 349/58
6,002,582 A  * 12/1999  Yeager et al. ................ 361/681

FOREIGN PATENT DOCUMENTS

| BE | 881.912 | 2/1980 |
| DE | 42 32 214 A1 | 4/1993 |
| DE | 690 30 552 T2 | 9/1997 |
| GB | 2152761 | 8/1985 |
| GB | 2236910 | 4/1991 |
| GB | 2258953 | 2/1993 |
| JP | 64-17571 | 1/1989 |
| JP | 03-017628 | 1/1991 |
| JP | 3-75477 | 7/1991 |
| JP | 4-134900 | 5/1992 |
| JP | 4-105775 | 9/1992 |
| JP | 9-146466 | 6/1997 |
| JP | 11-073117 | 3/1999 |

* cited by examiner

Primary Examiner—Darren Schuberg
Assistant Examiner—Yean-Hsi Chang
(74) Attorney, Agent, or Firm—McKenna Long & Aldridge LLP

(57) ABSTRACT

A portable information processing apparatus having a thin thickness and a lightweight. In the apparatus, a top bezel of a display device is made from a metal such as aluminum or aluminum alloy which has a large intensity a light weight and a good conductiblity compared to a plastic. The top bezel is electrically connected to a liquid crystal display module for electromagnetic shielding. The top bezel and the liquid crystal display module may be electrically connected to a hinge to improve a static electricity shielding effect.

32 Claims, 7 Drawing Sheets

PORTABLE INFORMATION PROCESSING APPARATUS

BACKGROUND OF THE INVENTION

1. Field of the Invention

The present invention relates to an information processing apparatus, and more particularly, to a liquid crystal display apparatus having a liquid crystal display module. Although the present invention is useful for a wide range of applications, it is particularly applicable in portable type of computers having flat displays.

2. Description of the Related Art

Generally, an example of the conventional portable information processing apparatus includes a so-called "notebook computer". Such a portable information processing apparatus needs to be lightweight, have a small dimension, be as thin as possible among others for its portability. Typically, the portable information processing apparatus is loaded with a liquid crystal display device so as to process picture data to be displayed and display the processed picture data on liquid crystal display areas.

Figure 1:
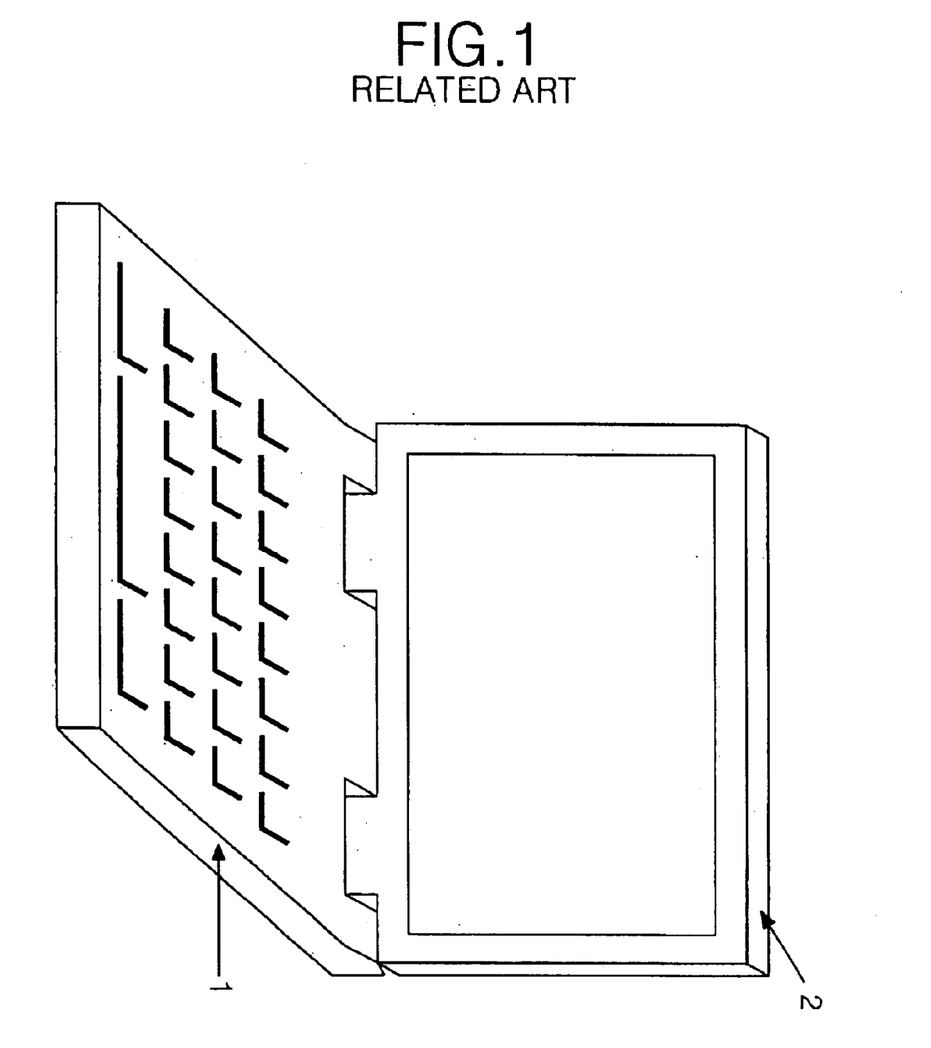
FIG. 1 is a schematic view of a conventional notebook computer having a liquid crystal display module.

FIG. 1 schematically illustrates a general notebook computer having a liquid crystal display module. As shown in FIG. 1, the notebook computer includes a main body 1 mounted with a keyboard functioning as an exterior interface, and a display 2 having a liquid crystal module which is coupled with the main body 1 to display processed information data. Also, the notebook computer includes a hinge for securing the display 2 to the main body 1.

Figure 2:
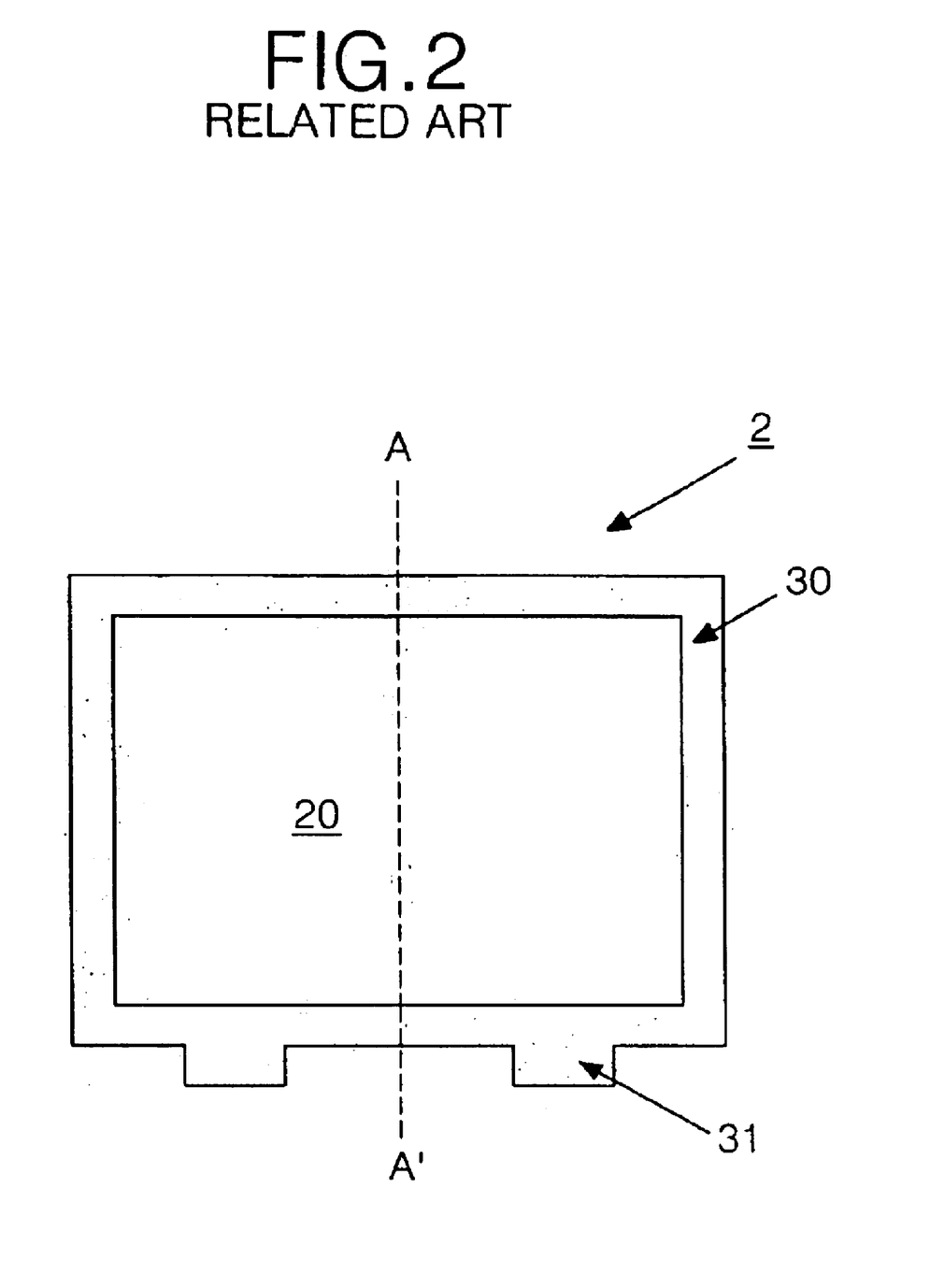
FIG. 2 is a front view of the display shown in FIG. 1.
Figure 3:
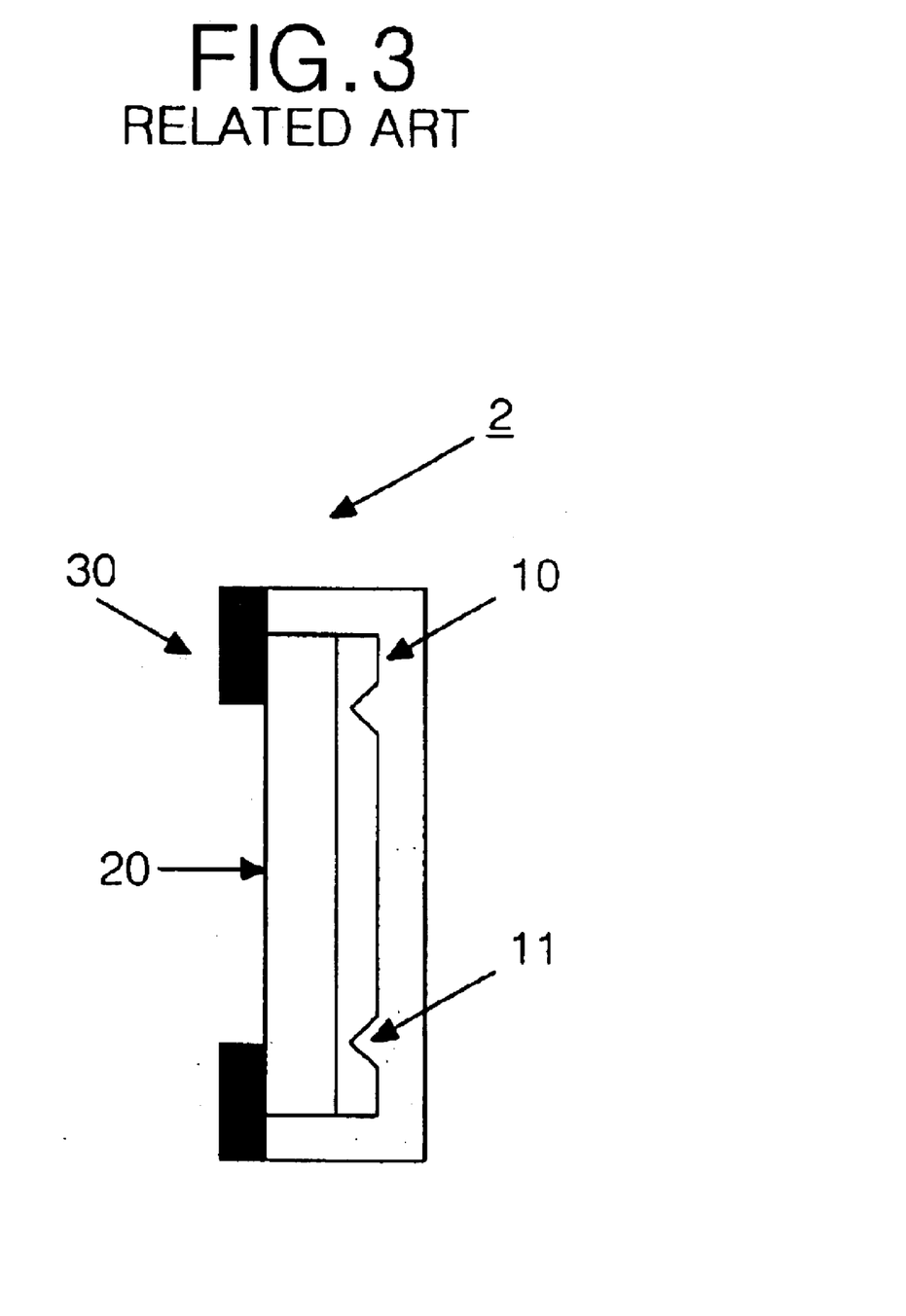
FIG. 3 is a sectional view of the display taken along a dotted line A–A' in FIG. 2.

FIG. 2 is a front view of the display 2 shown in FIG. 1. FIG. 3 is a sectional view of the display 2 taken along a dotted line A–A' of FIG. 2. Referring to FIG. 2 and FIG. 3, an enclosure 10 of the display 2 is a rear case of the display 2 for covering the keyboard of the notebook computer and which includes a liquid crystal display module 20. Typically, the enclosure 10 is made from plastic material and have a thickness t of about 1.2 to 1.4 mm. Further, the enclosure 10 includes ribs 11 having prominence or depressions in the horizontal and vertical direction so as to supplement a bending or twisting intensity of the enclosure 10. Specifically, the ribs 11 are formed by extending prominence or depressions defined on the surface of the enclosure 10 in the horizontal or vertical direction. Also, the enclosure 10 has a lower hinge case (not shown) protruded to cover a hinge securing the display 2 to the main body 1 as shown in FIG. 2 and FIG. 3. In FIG. 2 and FIG. 3, the liquid crystal display module 20 are mounted at the interior of the enclosure 10 to be secured to the enclosure 10 in a direction perpendicular to or parallel to a plane of the liquid crystal display. Such a securing scheme is classified into the front mounting method and the side mounting method depending upon a direction in which the liquid crystal display module 20 is secured to the enclosure 10. Further, a top bezel 30 is a front case of the display 2. The top bezel 30 covers the peripheral, except for the display area, of the liquid crystal display module 20 and is coupled with the enclosure 10. The top bezel 30 have an upper hinge case 31 protruded to cover the hinge as shown in FIG. 2 and FIG. 3. The top bezel 30 is usually made from plastic material and has a thickness of about 1.2 to 1.4 mm so as to prevent a bend or a twist.

Generally, the display 2 are coated with an electromagnetic shielding paint at the inner side of the enclosure 10 and the top bezel 30 in order to shield an electromagnetic interference (EMI) generated at the liquid crystal display module 20.

In the portable information processing apparatus as described above, however, the display 2 is thick and heavy because the top bezel 30 is made from the plastic material. Also, the portable information processing apparatus must be coated with the electromagnetic shielding paint to shield the EMI generated at the display 2. As a result, the conventional portable information processing apparatus has problems in that it has a large dimension (e.g., thickness), a heavy weight, an expensive cost (e.g., a cost for the electromagnetic shielding paint), etc.

SUMMARY OF THE INVENTION

Accordingly, the present invention is intended to solve the above-mentioned problems and its object is to provide a portable information processing apparatus that has a thin thickness and a lightweight.

A further object of the present invention is to provide a portable information processing apparatus that has a good electromagnetic shielding performance.

In order to achieve these and other objects of the invention, a liquid crystal display apparatus according to one aspect of the present invention includes a liquid crystal display module for displaying picture data; an enclosure loaded with the liquid crystal display module for surrounding the side surface and the rear surface of the liquid crystal display module; and a front case secured to the enclosure and the liquid crystal display module, the front case being made from aluminum or aluminum alloy to protect the circumference of a display area in the liquid crystal display module.

A portable information processing apparatus according to another aspect of the present invention includes a main body having an interfacing device; a hinge coupled to the main body; and a display apparatus, being mechanically coupled to the main body through the hinge, for displaying picture data received from the main body, the display apparatus having a liquid crystal display module for displaying picture data, an enclosure loaded with the liquid crystal display module for surrounding the side surface and the rear surface of the liquid crystal display module, and a front case secured to the enclosure and the liquid crystal display module, the front case being made from aluminum or aluminum alloy to protect the circumference of a display area in the liquid crystal display module.

A portable information processing apparatus according to yet another aspect of the present invention includes a main body having an interfacing device; a liquid crystal display module for displaying picture data received from the main body; an enclosure loaded with the liquid crystal display module for surrounding the side surface and the rear surface of the liquid crystal display module; a front case secured to the enclosure and the liquid crystal display module, the front case being made from aluminum or aluminum alloy to cover the circumference of a display area in the liquid crystal display module; and a hinge secured to the main body to have a rotation axis, the hinge having a hinge arm extended from the rotation axis to the enclosure to be positioned between the liquid crystal display module and the enclosure, wherein the liquid crystal display module, the hinge arm and the enclosure are commonly secured thereto.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENT

Figure 4:
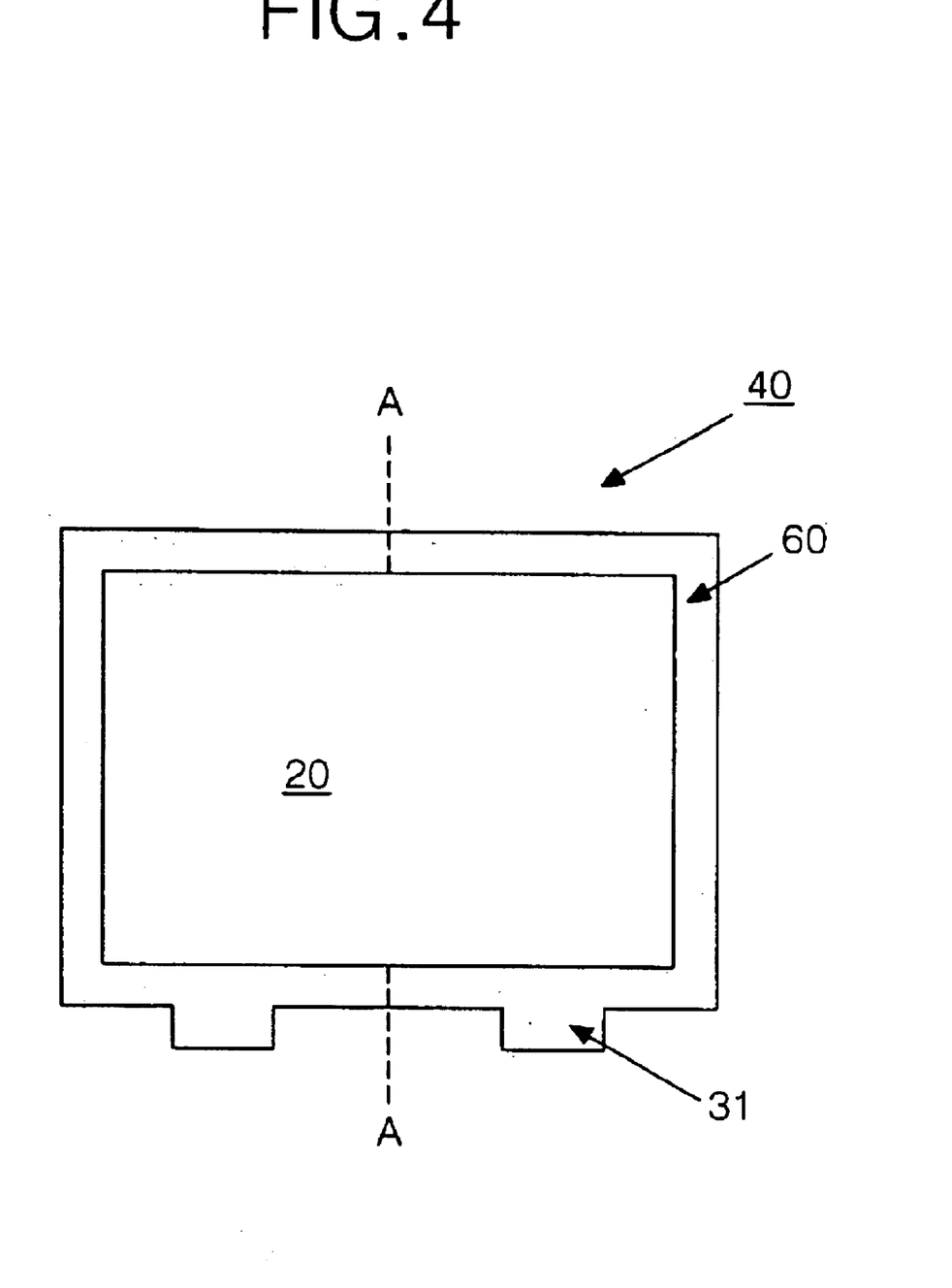
FIG. 4 is a front view of a display in a portable information processing apparatus according to a preferred embodiment of the present invention.
Figure 5:
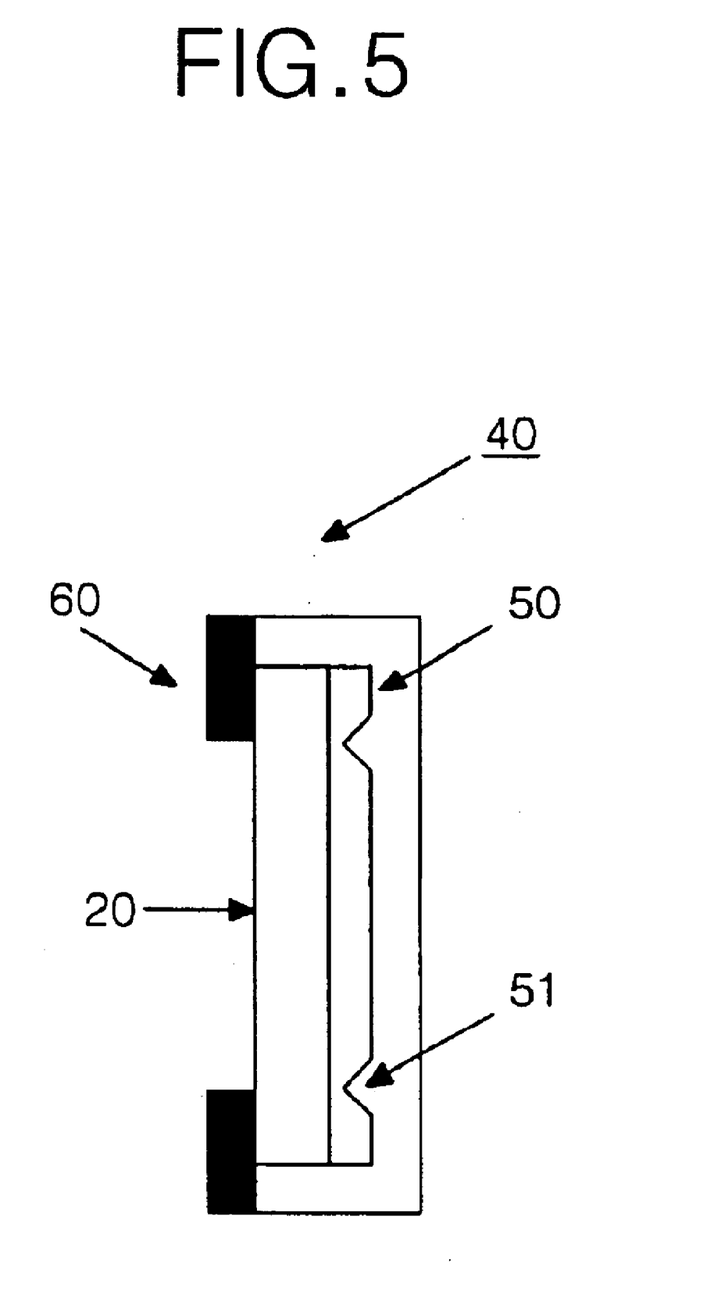
FIG. 5 is a sectional view of the display taken along a dotted line A–A' in FIG. 4.

Referring now to FIG. 4 and FIG. 5, there is shown a display 40 in a portable information processing apparatus according to an embodiment of the present invention. In FIG. 4 and FIG. 5, an enclosure 50 of the display 40 is a rear case of the display 40 for covering a keyboard in a portable information processing apparatus (e.g., notebook computer) and which includes a liquid crystal display module 20. Typically, the enclosure 50 is made from plastic material and have a thickness t of about 1.2 to 1.4 mm. Further, as shown in FIG. 5, the enclosure 50 includes ribs 51 having prominence or depressions in the horizontal and vertical direction so as to supplement a bending or twisting intensity thereof. Alternatively, the enclosure 50 may be made from aluminum or aluminum alloy. In this case, the enclosure 50 has a thickness of about 0.5 to 0.7 mm.

In FIG. 5, a top bezel 60 covers the peripheral, except for the display area, of the liquid crystal display module 20 and is coupled with the enclosure 50. The top bezel 60 is made from conductive aluminum or aluminum alloys and has a thickness of, for example, about 0.5 mm. In view of a characteristic of metal material, the top bezel 60 of the present invention having a thickness of about 0.5 mm as described above has an intensity similar to as well as a weight lighter than the conventional top bezel 30 made from plastic material having a thickness of about 1.2 to 1.4 mm as shown in FIG. 3.

As shown in FIG. 5, the liquid crystal module 20 are load at the interior of the enclosure 50 in such a manner to be secured to a side wall of the enclosure in a direction parallel to a plane of the liquid crystal display module using, for example, the side mounting method. Further, as shown in FIG. 6, the liquid crystal display module 20 is secured to the enclosure 50 while having a hinge arm 71 extending to a rotation axis of a hinge 70 therebetween.

Figure 6A:
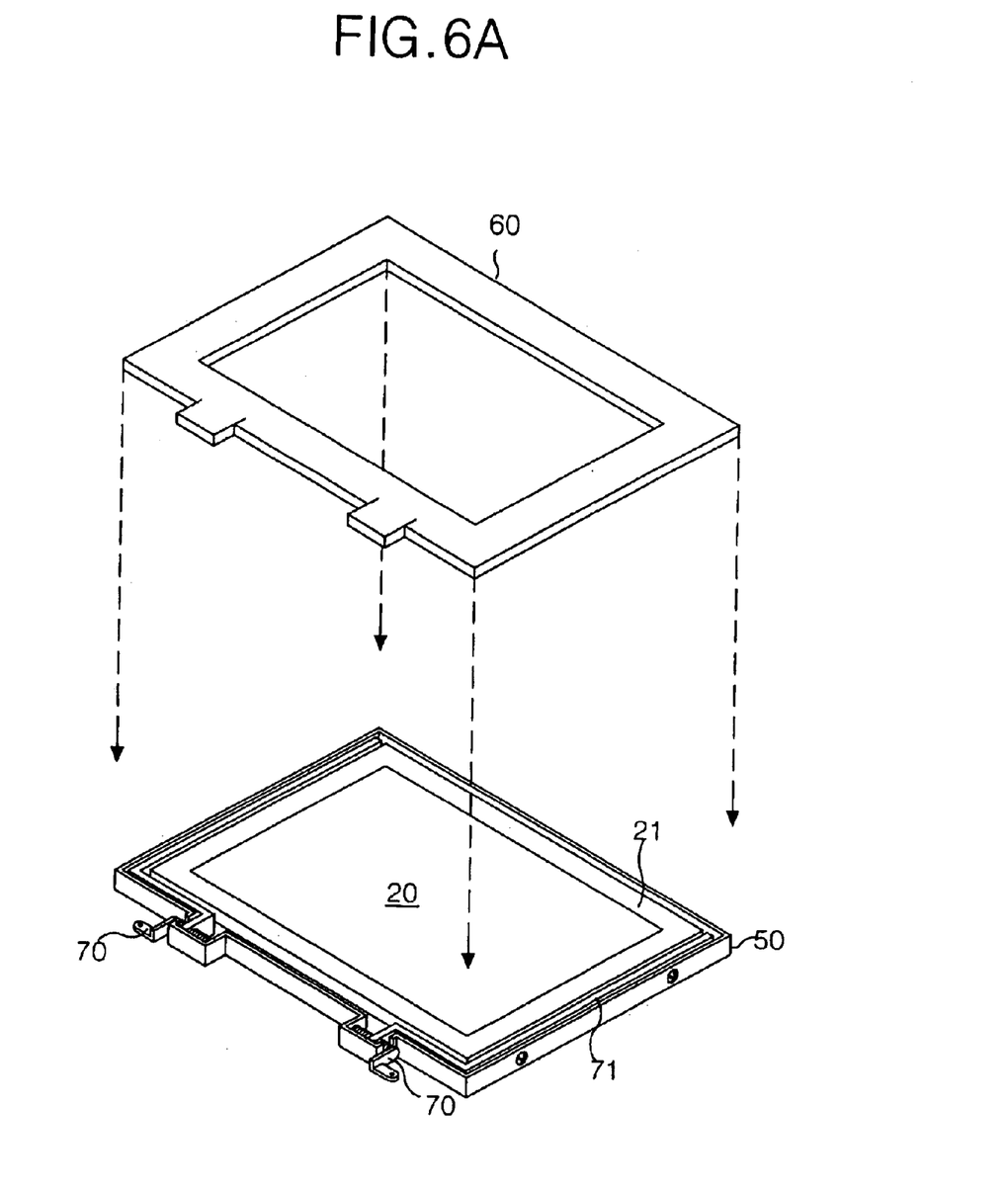
FIG. 6A and FIG. 6B are a perspective view and a sectional view of the display shown in FIG. 4, respectively.
Figure 6B:
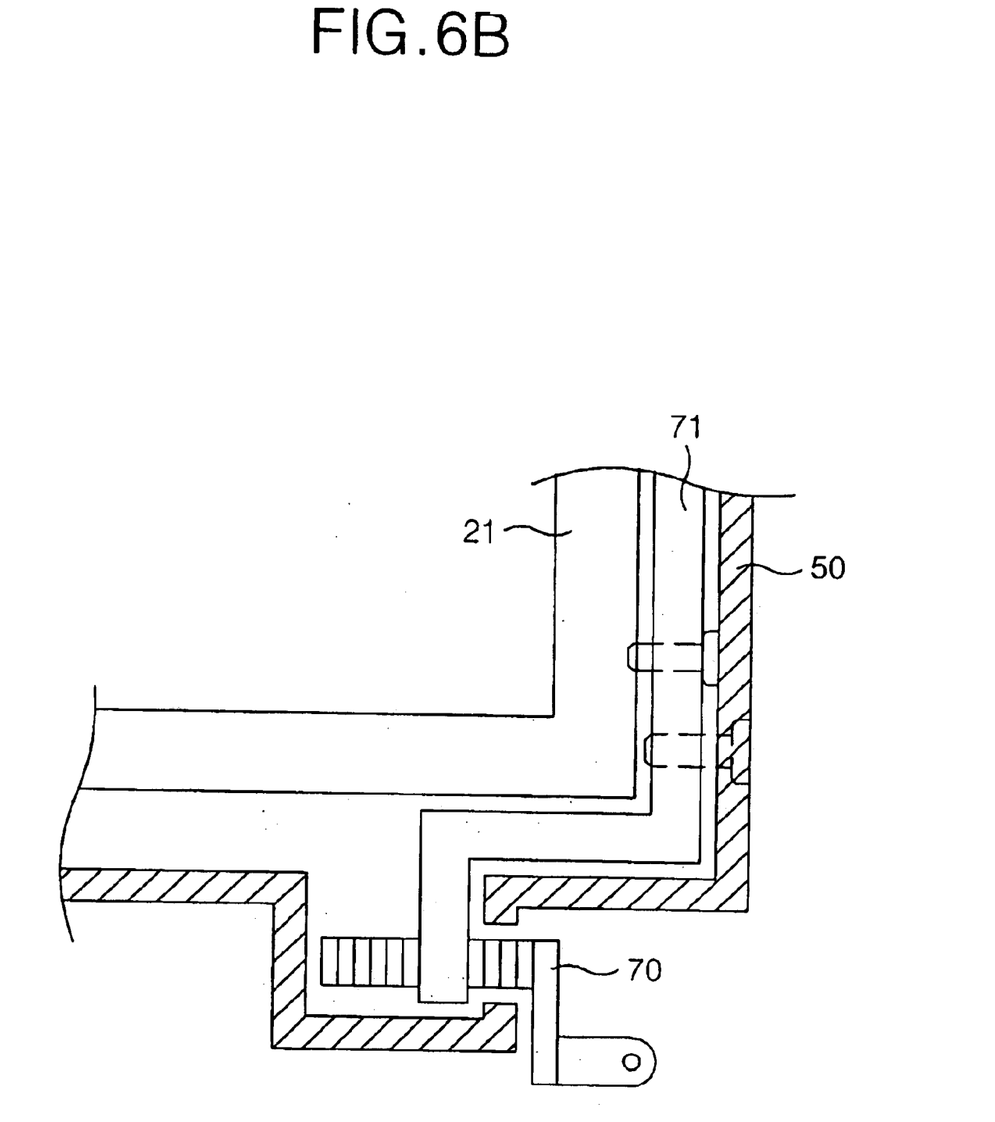

Referring now to FIGS. 6A and 6B, the top bezel 60 is mounted on the liquid crystal display module 20 and electrically connected thereto by way of a frame 21 of the liquid crystal display module 20 made from metal material. Also, the liquid crystal module 20 is electrically connected thereto because it is secured to the hinge arm 71. Accordingly, the top bezel 60 is electrically connected to the liquid crystal display module 20 and, at the same time, connected, via the metal frame 21 of the liquid crystal display module 20 to the hinge 70. As a result, an electromagnetic wave generated from the liquid crystal display module 20 is shielded by the top bezel 60 and grounded through the hinge 70.

As described above, in the portable information processing apparatus or the display apparatus according to the present invention, since its front case, i.e., top bezel is made from aluminum or aluminum alloy, it has thinner thickness and lighter weight than the conventional apparatus. Also, in the portable information processing apparatus according to the present invention, since the top bezel of the display apparatus is made from a conductive material, it is capable of shielding an electromagnetic wave generated from the liquid crystal display module.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A liquid crystal display apparatus, comprising:

a liquid crystal display module for displaying data a periphery of the front surface of the liquid crystal display module being covered with a metal frame;

an enclosure loaded with the liquid crystal display module and substantially surrounding a side surface and a rear surface of the liquid crystal display module; and a case secured to the enclosure and the liquid crystal display module, said case being made from aluminum or aluminum alloy to protect the circumference of a display area in the liquid crystal display module and electrically coupled to said liquid crystal display module via the metal frame.

2. The liquid crystal display apparatus as claimed in claim 1, wherein the enclosure has a thickness of about 0.5 to 0.7 mm.

3. The liquid crystal display apparatus as claimed in claim 1, wherein the case has a thickness of less than 1.2 mm.

4. The liquid crystal display apparatus as claimed in claim 1, wherein the case has a thickness of about 0.5 mm.

5. The liquid crystal display apparatus according to claim 1, wherein the liquid crystal display module includes a frame and the case is electrically connected to the frame of the liquid crystal display module.

6. A portable information processing apparatus, comprising:

a main body having an interface device;

a hinge coupled to the main body; and a display apparatus, being mechanically coupled to the main body through the hinge, for displaying data received from the main body, said display apparatus having a liquid crystal display module for displaying data, an enclosure loaded with the liquid crystal display module for surrounding a side surface and a rear surface of the liquid crystal display module, and a case secured to the enclosure and the liquid crystal display module, said case being made from aluminum or aluminum alloy, a periphery of the front surface of said liquid crystal display module being covered with a metal frame and the liquid crystal display being electrically coupled to the case via the metal frame.

7. The portable information processing apparatus as claimed in claim 6, wherein the enclosure has a thickness of about 0.5 to 0.7 mm.

8. The portable information processing apparatus as claimed in claim 6, wherein the case has a thickness of less than 1.2 mm.

9. The portable information processing apparatus as claimed in claim 6, wherein the case has a thickness of about 0.5 mm.

10. The portable information processing apparatus according to claim 6, wherein the liquid crystal display module includes a frame and the case is electrically connected to the frame of the liquid crystal display module.

11. A portable information processing apparatus, comprising:
- a main body having an interface device;
- a liquid crystal display module for displaying data received from the main body, a periphery of the front surface of said liquid crystal display module being covered with a metal frame;
- an enclosure loaded with the liquid crystal display module for surrounding a side surface and a rear surface of the liquid crystal display module;
- a case secured to the enclosure and the liquid crystal display module, said case being made from aluminum or aluminum alloy to cover the circumference of a display area in the liquid crystal display module; and
- a hinge secured to the main body and having a rotation axis, said hinge having hinge arm extending from the rotation axis, said hinge having hinge arm extending from the rotation axis to the enclosure to be positioned between the liquid crystal display module and the enclosure,
- wherein the case is electrically coupled to the hinge and the liquid crystal display module via the metal frame.

12. The portable information processing apparatus as claimed in claim 11, wherein the liquid crystal display module, the hinge arm, and the enclosure are commonly secured.

13. The portable information processing apparatus as claimed in claim 11, wherein the enclosure has a thickness of about 0.5 to 0.7 mm.

14. The portable information processing apparatus as claimed in claim 11, wherein the case has a thickness of less than 1.2 mm.

15. The portable information processing apparatus as claimed in claim 11, wherein the case has a thickness of about 0.5 mm.

16. The portable information processing apparatus according to claim 11, wherein the liquid crystal display module includes a frame and the case is electrically connected to the frame of the liquid crystal display module.

17. A display for a computer comprising:
- a display module, a periphery of the front surface of the display module being covered with a metal frame;
- a housing substantially surrounding the display module; and
- a bezel having a center opening corresponding to the display module, the bezel including aluminum or aluminum alloy and substantially covering a circumference of the display module, the bezel being electrically coupled to the display module via the metal frame.

18. The display according to claim 17, wherein the display module is a liquid crystal display module.

19. The display according to claim 17, wherein the housing has a thickness of about 0.5 to 0.7 mm.

20. The display according to claim 17, wherein the bezel has a thickness of less than 1.2 mm.

21. The display according to claim 17, wherein the bezel has a thickness of about 0.5 mm.

22. A computer comprising:
- a computer casing;
- a hinge coupled to the computer casing; and
- a display portion coupled to the computer casing through the hinge, the display portion including;
  - a display module having a display area, a periphery of the display area being covered with a metal frame;
  - a housing substantially surrounding the display module; and
  - a bezel having a center opening corresponding to the display area, the bezel including aluminum or aluminum alloy and substantially covering a circumference of the display module, the bezel being electrically coupled to the display module via the metal frame.

23. The computer according to claim 22, further comprising a hinge arm extending from the hinge to the enclosure and positioned between the display module and the enclosure.

24. The computer according to claim 22, wherein the display module is a liquid crystal display module.

25. The computer according to claim 22, wherein the housing has a thickness of about 0.5 to 0.7 mm.

26. The computer according to claim 22, wherein the bezel has a thickness of less than 1.2 mm.

27. The computer according to claim 22, wherein the bezel has a thickness of about 0.5 mm.

28. The computer according to claim 22, wherein the display module includes a frame and the bezel is electrically connected to the frame of the display module.

29. A computer comprising;
- a computer casing;
- a hinge coupled to the computer casing; and
- a display portion coupled to the computer casing through the hinge, the display portion including:
  - a display module having a display area;
  - a housing substantially surrounding a rear surface and a side surface of the display module; and
  - a bezel made from a metal material, the bezel having a opening portion corresponding to the display area and a protrusion covering the hinge.

30. A computer as claimed in the claim 29, wherein the metal material includes aluminum or aluminum alloy.

31. A computer as claimed in the claim 29, wherein the bezel is electrically coupled to the display module.

32. A computer as claimed in the claim 29, wherein a periphery of the front surface of the display module is covered with a metal frame.

* * * * *